United States Patent
Bauerschmidt et al.

[11] Patent Number: 6,014,083
[45] Date of Patent: Jan. 11, 2000

[54] METALCLAD SWITCHGEAR ASSEMBLY WITH PARTIAL DISCHARGE DETECTION

[75] Inventors: Peter Bauerschmidt, Schwabach; Ottmar Beierl, Aurachtal; Wolf-Eckhart Bulst; Valentin Magori, both of München; Thomas Ostertag, Finsing; Leonhard Reindl, Stephanskirchen; Gerd Scholl, München; Oliver Sczesny, Aschheim; Dieter Lorenz, Berlin, all of Germany

[73] Assignee: Siemens Aktiengesellschaft, Munich, Germany

[21] Appl. No.: 09/127,525

[22] Filed: Jul. 31, 1998

Related U.S. Application Data

[63] Continuation of application No. PCT/DE97/00091, Jan. 20, 1997.

[51] Int. Cl.[7] .................................................. G08B 21/00
[52] U.S. Cl. .......................... 340/635; 324/536; 324/126
[58] Field of Search .................... 340/635, 644, 340/647; 324/536, 514, 122, 126, 207.16

[56] References Cited

U.S. PATENT DOCUMENTS

| | | | |
|---|---|---|---|
| 4,277,746 | 7/1981 | Abe et al. | 324/72 |
| 4,617,513 | 10/1986 | Reinhardt | 324/126 |
| 4,677,524 | 6/1987 | Shiraishi et al. | 361/335 |
| 5,200,737 | 4/1993 | Konishi et al. | 340/644 |
| 5,252,927 | 10/1993 | Bruhlmeier et al. | 324/546 |
| 5,804,972 | 9/1998 | De Kock et al. | 324/536 |
| 5,903,157 | 5/1999 | Achatz et al. | 324/535 |
| 5,917,316 | 6/1999 | Bosco et al. | 324/126 |

FOREIGN PATENT DOCUMENTS

| | | |
|---|---|---|
| 0342597A2 | 11/1989 | European Pat. Off. . |
| 0596879B1 | 4/1995 | European Pat. Off. . |
| 2427830 | 1/1975 | Germany . |
| 3045205A1 | 7/1982 | Germany . |
| 3912506A1 | 3/1990 | Germany . |
| 9420199.4 | 3/1995 | Germany . |

OTHER PUBLICATIONS

Japanese Patent Abstract No. 01195112 (Katsuaki), dated Mar. 13, 1991.
"ETG–Sponsortagung mit ABB Hochspannungstechnik AG, Zürich", Armin Diessner, May/Jun. 1994, pp. 59–67.

*Primary Examiner*—Toan Pham
*Attorney, Agent, or Firm*—Herbert L. Lerner; Laurence A. Greenberg

[57] ABSTRACT

A metalclad switchgear assembly for high or medium voltage, having a cladding, includes at least one sensor arranged in an interior space of the cladding for detecting a condition variable within the cladding, the sensor having an antenna; and a transmitting and receiving antenna directed towards the interior space, the transmitting and receiving antenna serving for performing a wireless information interchange with the sensor, and for simultaneously detecting electromagnetically partial discharges in the interior space.

11 Claims, 1 Drawing Sheet

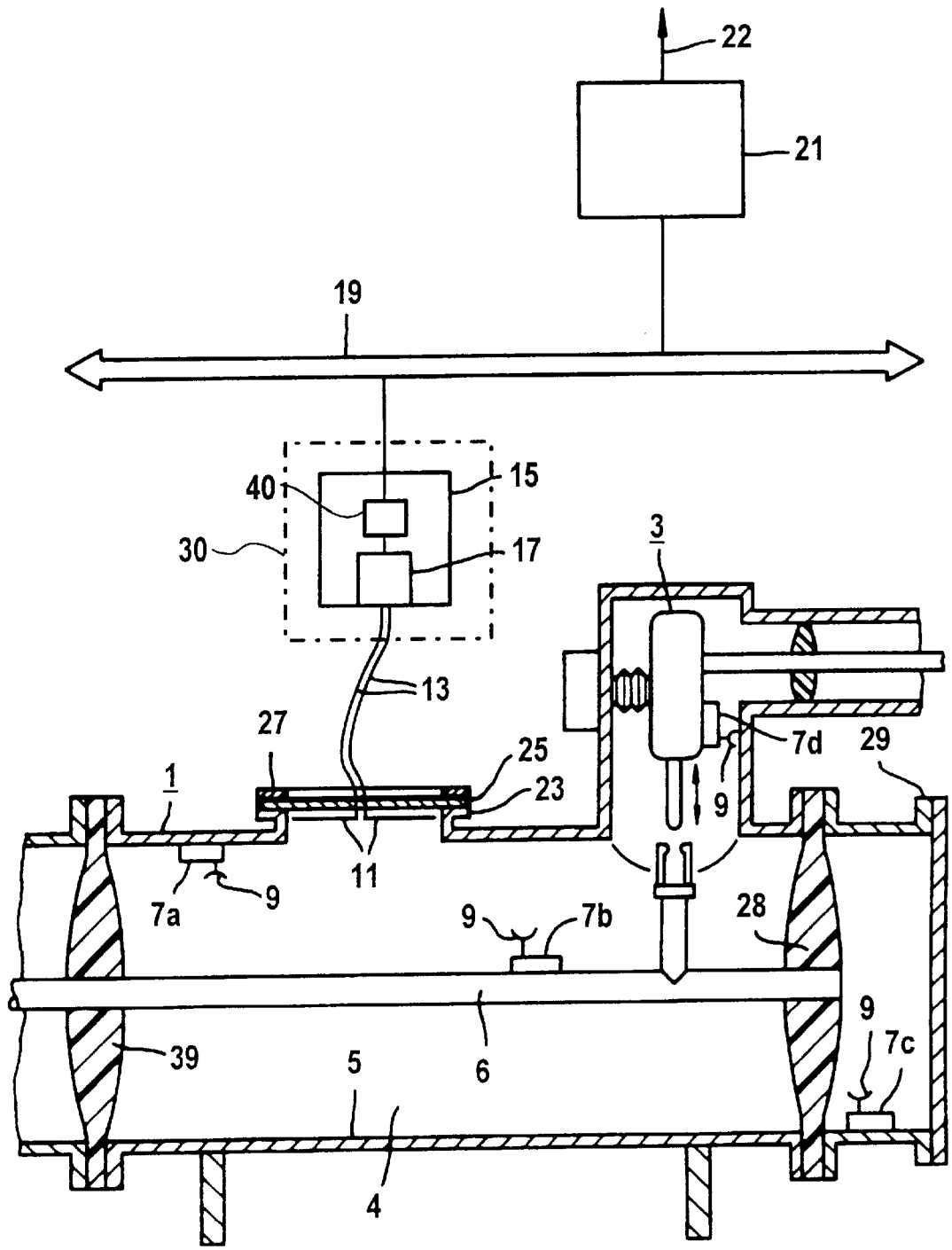

METALCLAD SWITCHGEAR ASSEMBLY WITH PARTIAL DISCHARGE DETECTION

CROSS-REFERENCE TO RELATED APPLICATION

This is a continuation of copending International Application PCT/DE97/00091, filed Jan. 20, 1997, which designated the United States.

BACKGROUND OF THE INVENTION

Field of the Invention

The invention relates to a metalclad switchgear assembly with partial discharge detection for the interior of the cladding.

With regard to the operation of high or medium-voltage switchgear assemblies, a general aim is to identify and remove disturbances as early as possible. This relates in particular to partial discharges, which are often a preliminary sign of serious disturbances, for example flashovers. In clad or encapsulated systems, partial discharges from the outside can be detected only with difficulty.

A measurement system for identifying such disturbances has been disclosed, for example, in the article "Sensorik fur GIS-Anlagen" (Sensor system for GIS assemblies), by Armin Diessner, published at the ETG Sponsor symposium from May 3 to Jun. 29 1994. In the measurement system described therein, disturbance signals are output by measurement probes, and are analyzed.

German Utility Model 94 20 199 discloses a metalclad high-voltage switchgear assembly in which a surface acoustic wave (SAW) element is arranged in one of a plurality of gas areas thereof. The SAW is used to detect gas components which are produced as a result of an arc acting upon the quenching gas contained in the cladding, or for detection of pressure waves. In this case, an antenna is arranged on the outside of the cladding and is used for wireless information transmission to an evaluation device.

SUMMARY OF THE INVENTION

It is accordingly an object of the invention of the instant application to provide a metalclad switchgear assembly or tubular conductor with partial discharge detection, the complexity level of which is kept quite low.

With the foregoing and other objects in view, there is provided, in accordance with one aspect of the invention, a metalclad switchgear assembly for high or medium voltage, having a cladding, and comprising at least one sensor arranged in an interior space of the cladding for detecting a condition variable within the cladding, the sensor having an antenna; and a transmitting and receiving antenna directed towards the interior space, the transmitting and receiving antenna serving for performing a wireless information interchange with the sensor, and for simultaneously detecting electromagnetically partial discharges in the interior space.

In accordance with another feature of the invention, the metalclad switchgear assembly includes a processing device connected to the transmitting and receiving antenna, the processing device having an identification device for distinguishing between a partial discharge signal and a response signal from the sensor, a message signal being producible upon the identification of the partial discharge signal.

In accordance with a further feature of the invention, the identification device has storage memory wherein at least characteristic partial features of partial discharge signals and/or response signals are stored for comparison with the signals detected by the transmitting and receiving antenna.

In accordance with an added feature of the invention, the identification device is operative for evaluating a characteristic frequency spectrum and/or a characteristic signal profile in order to identify a partial discharge signal.

In accordance with an additional feature of the invention, the evaluation of the characteristic frequency spectrum and the characteristic signal profile, respectively, is at an overshooting of a level.

In accordance with yet another feature of the invention, the identification device is operative for rejecting as invalid any information which is detected within a predetermined time of a partial discharge.

In accordance with yet a further feature of the invention, the identification device is operative for repeating the information transmission after rejection of any information.

In accordance with yet an added feature of the invention, the identification device, in order to identify a partial discharge, is operative for performing one of the steps of additionally linking and comparing the detected signal with a measurement signal of a sensor or of a protection device.

In accordance with yet an additional feature of the invention, the sensor is constructed as a surface acoustic wave sensor.

In accordance with another feature of the invention, the metalclad switchgear assembly includes a plurality of sensors besides said at least one sensor for detecting respective condition variables within the cladding, the transmitting and receiving antenna serving for performing a wireless information interchange with all of the plurality of sensors as well as with the one sensor.

In accordance with a concomitant feature of the invention, there is provided a metalclad tubular conductor for high or medium voltage, comprising at least two transmitting and receiving antennas directed towards the interior of the tubular conductor for performing an information interchange between the antennas, at least one of the transmitting and receiving antennas being simultaneously effective for detecting partial discharges within the interior of the tubular conductor.

It has been found that, despite completely different objectives, two functions can be achieved here with a common device, a number of steps being necessary to accomplish the objectives. The switchgear assembly according to the invention has only one detection element, namely only one antenna or one antenna element in the interior of the cladding for PD measurements and for other monitoring and detection of measurement variables. The sensors are preferably constructed as SAWs, which are particularly small and can be accommodated in the switchgear assembly without any problems. The object was also achieved, inter alia, only when the sensor is arranged with the antenna thereof in the interior space. Simultaneous PD detection and remote interrogation of assembly information are thus possible.

It is advantageous if a processing device is provided which is connected to the transmitting and receiving antenna and comprises an identification device for distinguishing between a partial discharge signal and a response signal from an SAW, a message signal being produced when a partial discharge is identified. This provides selective fault identification, in which case it is possible, if required, to pass the message signal via a control and monitoring device to a further processing device. The control and monitoring device, together with the processing device can form a structural unit.

The identification device may advantageously comprise storage memory in which at least characteristic partial features of partial discharge signals and/or response signals are stored, with which the detected signals are compared. In this way, it is possible to make a positive and/or negative statement relating to the presence of a PD or a response signal. It is conceivable that an arrangement like a type of expert system with a databank is realizable using this method.

For example, a characteristic frequency spectrum and/or a characteristic signal profile, for example a maximum level, can preferably be used to identify a partial discharge signal. In principle, further identification routines can also be used based upon the invention of the instant application, such as those which have been disclosed in the prior art (for example, the published European Patent Document EP 0 596 879 B1). These include, in particular, Fourier analysis of the spectrum and use of fuzzy logic or a neuronal network for weighted assessment. If required, partial discharges may also be evaluated statistically, so that an avalanche effect can be identified.

Any information detected within a predetermined time period before or after the occurrence of a PD can advantageously be rejected as invalid. A safety margin is thus always provided between the information level and the disturbance level. Changed or disturbed data information is thus not evaluated.

Once information has been rejected, the information transmission can advantageously be repeated. This ensures that as far as possible no data loss, or only a small amount of data loss, occurs.

It is also conceivable for the detected signal also to be linked to or compared with a measurement signal from a surface acoustic wave sensor in order to identify a PD. This linking of information allows a more a ccurate statement to be made on the presence of a PD. If necessary or desirable, a logic link may also be provided to signals from other protection devices in the assembly, for example distance protection or busbar protection, if necessary or desirable, taking into account weighted viewpoints using fuzzy logic, so that accurate fault identification is provided, which is reliable even in critical or unfavorable operating situations. This makes reliable operation of the switchgear assembly possible.

The object is furthermore achieved according to the invention by a metalclad tubular conductor for high or medium voltage, having at least two transmitting and receiving antennas which are directed towards the interior and between which an information interchange takes place, in which case at least one transmitting and receiving antenna is simultaneously used for the detection of partial discharges within the interior. The examples described in the following text also apply in the same sense to this information transmission arrangement.

Other features which are considered as characteristic for the invention are set forth in the appended claims.

Although the invention is illustrated and described herein as embodied in a metalclad switchgear assembly with partial discharge detection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, wherein:

BRIEF DESCRIPTION OF THE DRAWING

The single FIGURE of the drawing is a diagrammatic and schematic, longitudinal sectional view of a metalclad switchgear assembly with partial discharge detection according to the invention.

DESCRIPTION OF THE PREFERRED EMBODIMENTS

Referring now to the single figure of the drawing, there is shown therein, in general, a metalclad switchgear assembly having a monitoring device, wherein information transmission is effected at radio frequency. It is self-evident that the monitoring device can also be used for other functions within the switchgear assembly, for example, for detecting a switch position without sensors, employing a radar principle, for additional control tasks or purely for information transmission.

The single figure shows a clad or encapsulated, gas-insulated switchgear assembly 1 which is generally of the type disclosed, for example, in the prior art according to the aforementioned German Utility Model 94 20 199. The switchgear assembly 1 is suitable for high or medium voltage. By the term switchgear assembly there is meant herein also a clad tubular conductor without any switching elements.

In this longitudinal sectional view of part of the switchgear assembly 1, there is shown a branch with a switching device 3, such as a disconnector or an interrupter unit, in particular. A busbar 6, such as an electrical conductor, extends centrally to the cladding or encapsulation 5. Reference may be made to the aforementioned German Utility Model for further details regarding the switching device 3 and the function thereof. Surface acoustic wave sensors (SAW) for widely different tasks are arranged in the interior 4 of the cladding 5 of the switchgear assembly 1, such as, for example, a SAW 7a for temperature detection, a SAW 7b for current detection, a SAW 7c for gas identification and a SAW 7d for position identification. Further SAWs for other functions or tasks, such as light identification, pressure measurements, and so forth, for example, are also conceivable in this case.

As receiving and transmitting members, each SAW has at least one antenna 9 for information transmission, in particular, for interrogation. The information transmission in this case takes place from the SAWs 7a to 7d to a central transmitting and receiving antenna, which acts for all the SAWs 7a to 7d and is referred to as the antenna element 11 hereinafter.

The terms antenna, transmitting and receiving antenna, antenna element or receiving and transmitting members or means, as used herein, are meant to be any radiating and receiving elements which allow emission and/or reception of electromagnetic or optical waves, for example radio antennas, ultrasound or optical transmitting and receiving elements (for example infrared elements), and encompass, as well, a split in the transmitting and receiving direction. By way of example, the embodiment according to the single figure of the drawing relates to radio information transmission.

The antenna element 11 is connected to a control and monitoring device (referred to hereinafter as the monitoring device 15) via suitable lines 13, for example, a coaxial cable, if necessary or desirable, with a matching element connected in-between. This monitoring device 15 includes a transmitting and receiving section 17 and a further device for signal evaluation, which is otherwise not illustrated in any greater detail, and for which purpose a processor with a memory device may possibly be provided.

The transmitting and receiving section 17, or at least parts thereof, can in principle also be arranged decentralized in the case of the antenna element 11, so that only low-power data traffic takes place between the monitoring device 15 and the antenna element 11. The transmitted power is then produced decentralized.

It is also conceivable for the antenna element 11 to be connected by cable to a decentralized device, or wirelessly directly to a bus 19. The monitoring device 15 together with the transmitting and receiving section 17 and the connected antenna element 11 may also be referred to as a transmitting/ receiving device or transceiver for the purposes of the concept at hand.

The monitoring device 15 may, for example, be a central unit in a switchgear assembly or else a device which is related to a branch or piece of equipment and connected for data purposes to a superordinate control center 21 via a further data link, for example, the bus 19. This control center 21 may be a local control center which is, in turn, connected to a superordinate network control center via a suitable interface 22.

Of course, at least the control center 21 includes suitable control and display devices, such as a keyboard and a screen or monitor, for example, for operating the switchgear assembly 1. A portable unit, for example, an otherwise non-illustrated portable computer or a laptop, can also be connected via suitable interfaces to various points in the system shown in the single figure of the drawing, for example, to the bus 19 or to the monitoring device 15, for control purposes or for other inputs and outputs.

The illustrated data links may be configured as required, for example, as a cable link, in particular, a wire cable or an optical conductor, or a wireless link, for example, a radio, sound or optical link.

In the embodiment of the invention presented herein, the antenna element 11 is arranged in an opening within the cladding or encapsulation 5. The opening in the illustrated embodiment is defined by a flange 23, which is closed by a closure element 25, for example, a cover and a pressure gasket 27. Screw units, which are otherwise not shown in detail herein, may also, of course, be provided for the flange joint in accordance with the prior art.

The antenna element 11 is thus located within the cladding or encapsulation 5, thereby providing ideal conditions for problem-free information transmission to the SAWs 7a to 7d. Because the antenna element 11 is located virtually within a connecting stub and does not project into the interior space 4, electrical or technical field problems are avoided here. Furthermore, the antenna element 11 and a component which is in any case detachable from the cladding 5 form a structural unit, so that it is readily accessible or else can be retrofitted.

Some of the SAWs 7a to 7d are, in this regard, arranged on the cladding 5, some on the busbar 6, and some on a moving part of the switching device 3 or else on or behind a first insulator 28, possibly in a separate gas chamber. A plurality of sensors for different functions may possibly be arranged jointly at one location and have a common antenna. It is also possible for one sensor to have a plurality of measurement functions. The sensors may advantageously be formed, in shape and size, like a credit card, the major part of the card forming the antenna.

An essential feature for the operation of the overall monitoring system is that a reliable radio or data link exists within the cladding 5. To this end, the insulator 28 is formed of a dielectric material so that there is also no adverse effect on radio-frequency transmission between the antenna element 11 and the SAW 7c located behind the insulator 28. In the case of other transmission methods, the insulator 28 must be formed of an appropriate material, such as glass for optical transmission, for example.

The flange 23 or the opening required for injection may be, for example, part of an existing maintenance opening of a gas filling connecting stub, a casting resin filling opening, an inspection hole or an end flange. The configurations described by way of example herein may thus be used for this purpose for any possible openings on switchgear assemblies, for example, for the illustrated end flange 29, as well. A specially provided opening may also be used.

It is also conceivable for the antenna element 11 to be arranged outside the cladding 5 and to radiate into the interior space 4 via a dielectric window. In this case, the opening may be, for example, a filling connecting stub formed in the region of a connecting flange for two cladding sections, in which case the antenna element, which may be formed as a rod antenna, is cast in the opening.

If an otherwise non-illustrated further antenna with an associated control device is arranged in the gas chamber behind the further insulator 39, the interior 4 of the cladding 5 may also be used as a transmission area, in which case protected data transmission over long distances is possible. This option can be used preferably in the case of tubular conductors. A combination with a simultaneous sensor interrogation is conceivable.

The monitoring device 15 together with the transmitting and receiving section 17 may, as the processing device 30 with the antenna element 11, also have a further additional or alternative function: the processing device 30 is then simultaneously used for detecting partial discharges (PD) within the cladding 5.

In this regard, the antenna element 11, which is formed as a radio antenna, is simultaneously used as a detection sensor for a PD. Accordingly, only one antenna or, if fitted within the encapsulation 5, possibly only one bushing is required for the cables 13. Under some circumstances, the antenna element 11 may also be constructed in two parts, for both functions.

If necessary or desirable, separate evaluation devices may be used for detecting the PDs and for interchanging information with the SAWs. In this regard, it is conceivable for these devices to be connected jointly to the antenna element 11 via a suitable antenna switch.

A common processing device, namely the monitoring device 15, in the case at hand, is preferably used for both functions, however. This monitoring device 15 is preferably constructed as a digital signal processing device, particularly with a computer and/or a digital signal processor. This also allows complex measured value processing operations to be performed, such as Fourier analyses, fuzzy decisions or neuronal procedures, for example. If necessary or desirable, the monitoring device 15 may also perform control functions.

In this regard, the monitoring device 15 has an identification device 40 for distinguishing between a partial discharge signal and a response signal from a SAW. If a PD is identified, a message signal is produced which, if necessary or desirable, can be passed on via the bus 19 and the control center 21, and can be displayed.

The signals respectively received in the identification device 40 are investigated for characteristic features of PDs. For this purpose, the identification device 40 may include a storage wherein at least characteristic partial features of PDs and response signals are stored. The received signals are then compared with the stored partial features, for seeking out matches as much as possible. In the event of a match for the respective signal type, an appropriate consequential reaction is initiated. In the case of a PD, this may be a message signal, for example.

A characteristic frequency spectrum and/or a characteristic signal profile are preferably used for identification of a PD. In general, other methods heretofore known from the prior art for more accurate PD detection or identification are also possible, for example, using mean values and differences, phase comparisons, in particular with the phase variables of the current and voltage in the respective switchgear assembly, or special filter methods for selection of the PD. As a rule, the SAWs 7a to 7d are interrogated at regular intervals or on regular cycles. In contrast, a PD does not occur regularly. If required, signal processing and analysis can also be performed by forming mean values.

If a response signal is received within a predetermined time in the event of a PD, an assumption may then be made that this response signal has been corrupted or changed by the PD. It is thus advantageous if information or response signals received within a predetermined time or within a time window before or after the occurrence of a PD are rejected as invalid. This precaution can prevent erroneous data processing. To compensate for this, if necessary, repetition of the information transmission may be stimulated, due to which the loss of data or information is kept relatively low.

In order to improve the accuracy of the statements relating to the presence of a PD, the message signal may also be logically linked to a further signal. Suitable signals for this purpose include, for example, measurement signals from a SAW, signals from existing protection devices, such as distance protection or busbar protection, for example, or measurement signals, such as a current or a voltage, for example, which are detected within the switchgear assembly 1. In this regard, it is advantageous for the measurement signals to be present in data form in the monitoring device 15, or at least in the control center 21, so that central, preferably digital, evaluation is possible.

Under some circumstances, weighted assessment of existing information or signals may also be advantageous. If fuzzy logic is used, it is conceivable, by using weighted viewpoints, to obtain very surprising or new information if the signal statements or decision statements are not clear, and such information is advantageous for reliable operation of the switchgear assembly 1. Identification may also be performed more quickly and reliably in the future if a neuronal network is used to perform a "learning" process from previous fault situations.

Frequencies within the range of 1 GHz +/−500 MHz are preferably investigated in detail in the processing device 30, the information interchange between the SAWs 7a to 7d in this case using narrow frequency bands, while a PD produces a broadband signal mixture. A distinction is also conceivable just on this basis.

The aforementioned individual features and configurations of the novel concept in the instant application are, of course, also combinable with one another or with features from the prior art within the context of specialist activity, without departing from the basic essence of the concept. It is essential for the novel concept that a PD measurement be possible in combination with monitoring of the switchgear assembly by sensors or with information transmission within the cladding by a standard, common processing and detection device.

We claim:

1. A metalclad switchgear assembly for high or medium voltage, having a cladding, and comprising at least one sensor arranged in an interior space of the cladding for detecting a condition variable within the cladding, said sensor having an antenna; and a transmitting and receiving antenna directed towards the interior space, said transmitting and receiving antenna serving for performing a wireless information interchange with said sensor, and for simultaneously detecting electromagnetically partial discharges in the interior space.

2. The metalclad switchgear assembly according to claim 1, including a processing device connected to said transmitting and receiving antenna, said processing device having an identification device for distinguishing between a partial discharge signal and a response signal from said sensor, a message signal being producible upon the identification of the partial discharge signal.

3. The metalclad switchgear assembly according to claim 2, wherein said identification device has storage memory wherein at least characteristic partial features of partial discharge signals and/or response signals are stored for comparison with the signals detected by said transmitting and receiving antenna.

4. The metalclad switchgear assembly according to claim 2, wherein said identification device is operative for evaluating a characteristic frequency spectrum and/or a characteristic signal profile in order to identify a partial discharge signal.

5. The metalclad switchgear assembly according to claim 4, wherein the evaluation of the characteristic frequency spectrum and the characteristic signal profile, respectively, is at an overshooting of a level.

6. The metaldlad switchgear assembly according to claim 2, wherein said identification device is operative for rejecting as invalid any information which is detected within a predetermined time of a partial discharge.

7. The metaldlad switchgear assembly according to claim 6, wherein said identification device is operative for repeating the information transmission after rejection of any information.

8. The metalclad switchgear assembly according to claim 2, wherein said identification device, in order to identify a partial discharge, is operative for performing one of the steps of additionally linking and comparing the detected signal with a measurement signal of a sensor or of a protection device.

9. The metalclad switchgear assembly according to claim 1, wherein said sensor is constructed as a surface acoustic wave sensor.

10. The metalclad switchgear assembly according to claim 1, including a plurality of sensors besides said at least one sensor for detecting respective condition variables within the cladding, said transmitting and receiving antenna serving for performing a wireless information interchange with all of said plurality of sensors as well as with said one sensor.

11. A metalclad tubular conductor for high or medium voltage, comprising at least two transmitting and receiving antennas directed towards the interior of the tubular conductor for performing an information interchange between said antennas, at least one of said transmitting and receiving antennas being simultaneously effective for detecting partial discharges within the interior of the tubular conductor.

* * * * *

UNITED STATES PATENT AND TRADEMARK OFFICE
CERTIFICATE OF CORRECTION

PATENT NO : 6,014,083
DATED : January 11, 2000
INVENTOR(S) : Peter Bauerschmidt et al.

It is certified that error appears in the above-identified patent and that said Letters Patent is hereby corrected as shown below:

On the title page, item:

Item [30] should be inserted as follows:

Jan. 31, 1996     [DE]    Germany ....... 196 03 462.0

Signed and Sealed this

Sixth Day of March, 2001

Attest:

NICHOLAS P. GODICI

*Attesting Officer*     *Acting Director of the United States Patent and Trademark Office*